Patented June 25, 1929.

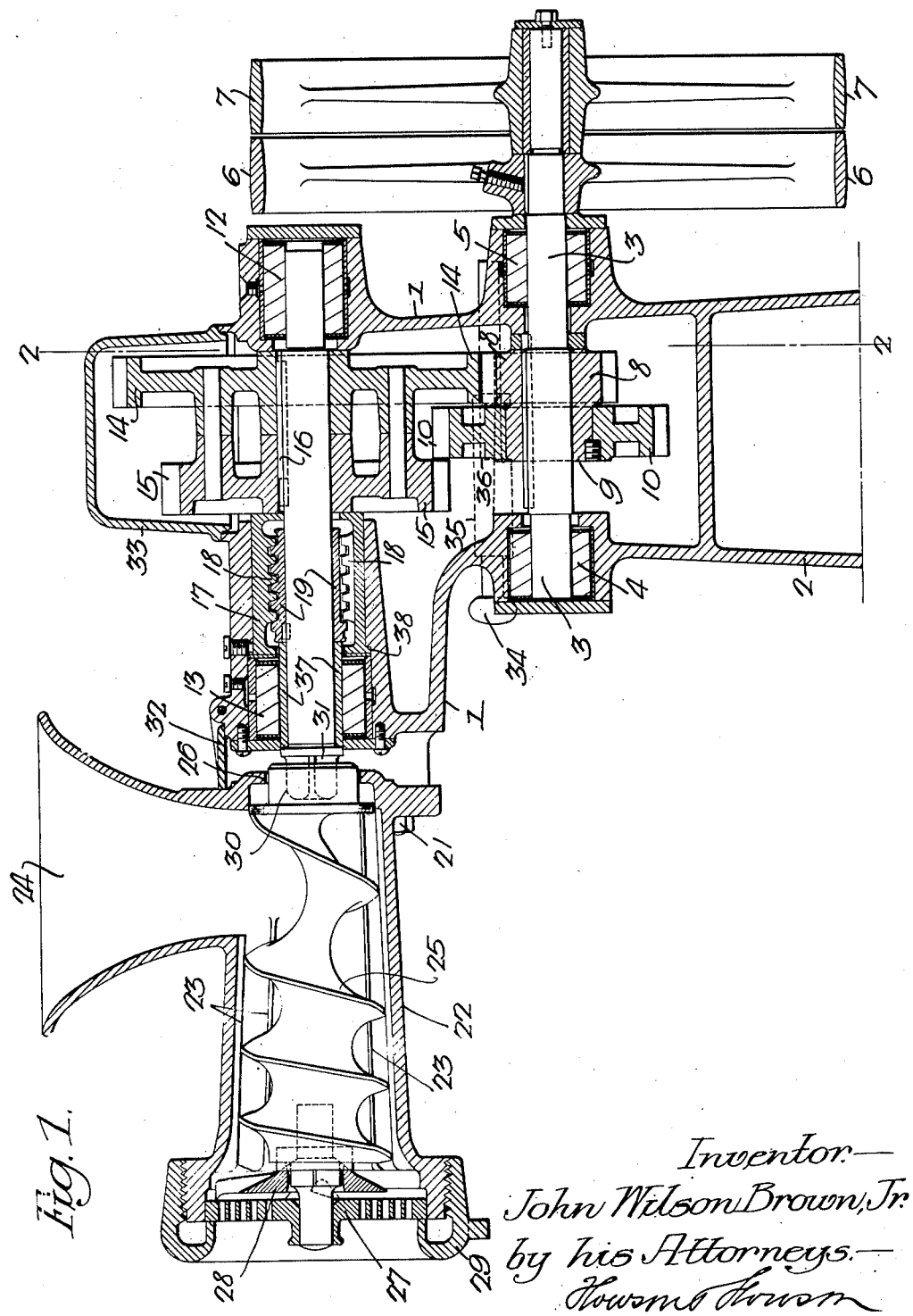

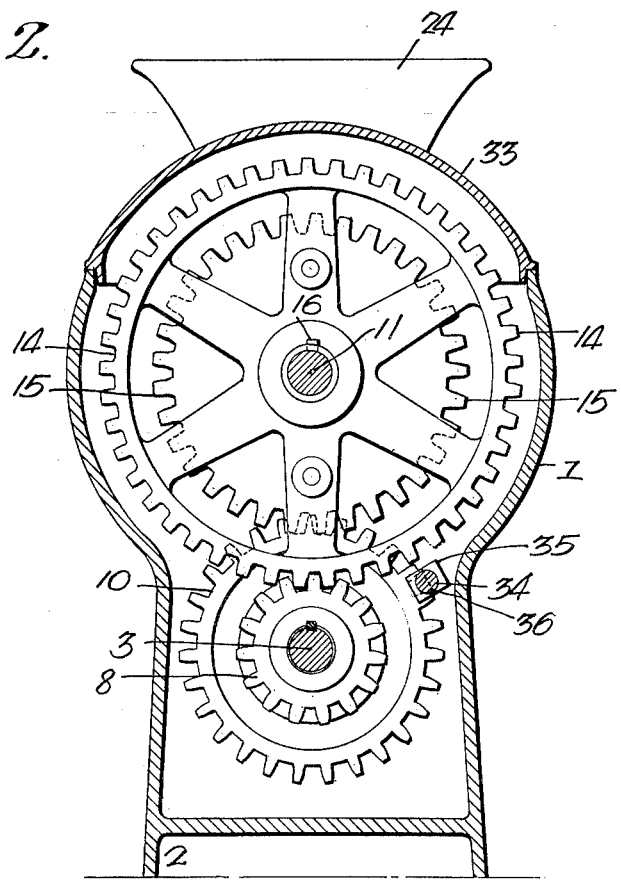
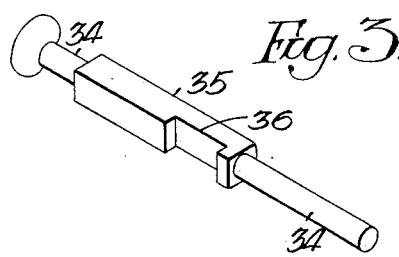

1,718,893

UNITED STATES PATENT OFFICE.

JOHN WILSON BROWN, JR., OF PHILADELPHIA, PENNSYLVANIA, ASSIGNOR TO THE ENTERPRISE MANUFACTURING COMPANY OF PENNSYLVANIA, OF PHILADELPHIA, PENNSYLVANIA, A CORPORATION OF PENNSYLVANIA.

DRIVING MECHANISM FOR POWER MEAT CHOPPERS.

Application filed August 1, 1923. Serial No. 655,084.

My invention relates to certain improvements in meat choppers of the type in which a screw feeds the material towards a perforated plate and a knife cuts the material projected into the openings of the plate.

One object of the invention is to provide a power driven means for operating the mechanism.

A further object of the invention is to design the driving mechanism so that it can be driven at two speeds.

In the accompanying drawings:

Fig. 1 is a longitudinal sectional view of a power meat chopper illustrating my invention;

Fig. 2 is a sectional view on the line 2—2, Fig. 1; and

Fig. 3 is a perspective view of the shifting bar.

Referring to the drawings, 1 is the frame mounted on a standard 2, made as an integral part of the frame. 3 is a driving shaft mounted in bearings 4 and 5 in the frame. These bearings, in the present instance, are shown as roller bearings. Secured to the shaft 3 is a pulley 6 and loosely mounted on the shaft is a pulley 7. Suitable shifting mechanism is provided for shifting the driving belt from one pulley to the other. Keyed on the shaft 3 is a pinion 8 having an extended hub 9 on which is secured a pinion 10, greater in diameter than the pinion 8.

11 designates a driven shaft mounted in bearings 12 and 13. Secured to the shaft 11 by a key 16 are two gear wheels 14 and 15. The gear wheel 14 is greater in diameter than the gear wheel 15 and meshes with the small pinion 8 when the pinion is shifted to the position shown in Fig. 1. The gear wheel 15 meshes with the large pinion 10 when the pinion 10 is shifted in line with said gear wheel.

By this arrangement, the shaft 11 can be driven at two speeds. Located between the bearing 13 and the gear wheel 15 is a thrust bearing 17 having a series of internal, annular ribs 18. Secured to the shaft is a sleeve 19 having annular ribs that extend into the space between the ribs 18, as clearly shown in Fig. 1.

On the end of the shaft 11 is a head 31 and located between the head and the sleeve 19 of the thrust bearing is a sleeve 37. This sleeve transmits the thrust on the head of the shaft to the thrust bearing. The thrust bearing 17 is located between the bearing 13 and the hub of the gear wheel 15. The thrust bearing has a flange 38 at its forward end, which rests against the shoulder of the frame.

Secured to the frame 1 by bolts 21 is a casing 22 of the shape illustrated in Fig. 1 and having longitudinal, internal ribs 23 and a hopper 24.

25 designates a feed screw located in the casing. This feed screw extends through an opening 26 in the inner end of the casing and has its outer bearing in a perforated plate 27. On the feed screw is a knife 28, which cuts against the inner surface of the plate 27. A screw-threaded ring 29 retains the plate in position in the casing.

In the inner end of the screw 25 is a rectangular socket 30, which is arranged to receive the rectangular head 31 that extends into the socket and forms a coupling between the driven shaft 11 and the screw 25.

It will be noticed that the lateral bearing 13 for the shaft is located between the thrust bearing 17 and the coupling connecting the shaft with the screw 25 of the meat chopper. This coupling is a comparatively neat fit so that the lateral bearing 13 forms the rear bearing for the screw, the front bearing of the screw being in the perforated plate, as clearly shown in the drawings.

Pivoted to the frame 1, above the bearing 13, is a plate 32, which closes the space between the frame and the casing 22. A cap 33 is mounted on the frame 1 and encloses the upper portions of the gear wheels 14 and 15.

In order to provide a simple and effective means for shifting the pinions 8 and 10, a shifting bar 34 is provided, which extends through openings in the frame 1. This bar has a portion 35, rectangular in shape, which is notched at 36 to receive the pinion 10, as shown in Fig. 2, so that, when the bar is moved longitudinally, the two pinions can be shifted in order that the pinion 8 will mesh with the gear wheel 14, while the pinion 10 will run clear of its gear wheel. When the bar is shifted so that the pinion 10 will mesh with its gear 15, the pinion 8 will run clear of the gear wheel 14.

I claim:

The combination in driving mechanism for meat choppers, of a frame; a shaft mounted in the frame; roller bearings at the forward and rear end of the frame for supporting the shaft; a thrust bearing having a series of ribs and mounted in the frame directly back of the forward roller bearing; a sleeve on the shaft having ribs alternating with those of the thrust bearing; means for driving the shaft; a casing detachably secured to the forward end of the frame; and a feed screw in the casing engaged by the shaft, the forward roller bearing forming the rear bearing for the feed screw, the parts being so constructed that when the casing is removed from the frame the forward roller bearing and the thrust bearing can be detached from the casing.

JOHN WILSON BROWN, Jr.